Figure 1:
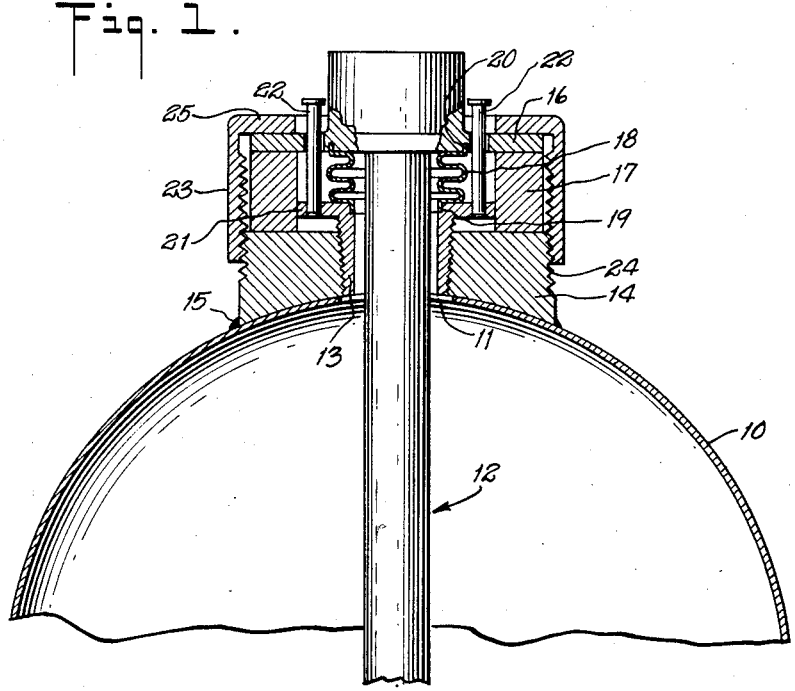

Oct. 21, 1958 A. T. GELLOS 2,856,773
LIQUID CONTENTS GAUGING MEANS FOR LIQUID OXYGEN
CONTAINERS AND THE LIKE
Filed Sept. 14, 1956

INVENTOR.
ALEXANDER T. GELLOS
BY R. J. Dearborn

ATTORNEY

United States Patent Office 2,856,773
Patented Oct. 21, 1958

2,856,773

LIQUID CONTENTS GAUGING MEANS FOR LIQUID OXYGEN CONTAINERS AND THE LIKE

Alexander T. Gellos, Flushing, N. Y., assignor to The Liquidometer Corporation, Long Island City, N. Y., a corporation of Delaware Application September 14, 1956, Serial No. 609,865

5 Claims. (Cl. 73—304)

The present invention relates to gauging means for fluids which are under pressure, such as liquified gases. Particularly, the present invention is applicable to the gauging of the amount of a liquified gas, such as liquid oxygen, in a tank or other container. As is well known, liquid oxygen is retained usually under high pressure and at a variety of different temperatures, the pressure varying with the temperature.

In view of the pressure and temperature requirements applicable to containers for holding liquified gases it is quite usual to require a pipe-threaded connection for any apparatus used with such a container and threaded thereinto, rather than a straight, substantially cylindrical threaded connection. Such pipe threads, or tapered threads may, for example, be required in specifications set up by a user of apparatus of this kind, so that no other type of threaded connection will be considered satisfactory in complying with these specifications. Furthermore, it is contemplated that under some extreme conditions of temperature and/or pressure, materials which might be used for gaskets might not be practically usable, so that a pipe thread might be required to be used to eliminate the necessity of the use of more or less conventional gasket material.

However, irrespective of the reason that a pipe thread type plug may be required, and assuming for the purposes of the present invention that there is some reason that a pipe thread is required, then the problem arises of how to position a probe or liquid sensing means in a tank of this general nature, so that it may be accurately and removably positioned therein, if this positioning is to be determined by the seating of a pipe thread type plug. As is well known, a pipe thread plug will seat from time to time at different axial positions. Thus, if a probe or liquid sensing means were to be rigidly connected with such a plug, it also would be positioned variably incident to the variable positioning of the pipe thread type plug.

The present invention provides a solution for this problem in that it provides a means, separate and distinct from the pipe threaded plug, for accurately positioning the probe or liquid sensing means, while still using a separate pipe threaded plug to comply with the requirements in that respect, and using a flexible metal member such as a diaphragm or metallic bellows which is sealed both to the pipe threaded plug and to a part rigid with the liquid sensing means, so as positively to prevent undesired egress of pressure. The liquid sensing means may then pass freely through a hole in the pipe threaded plug and be accurately positioned in the tank or container, irrespective of the point at which the pipe threaded plug seats in threading it into the complementarily threaded part of the container.

From a practical matter and to enable the parts to be used from the point of view of accessibility, it may further be necessary that there be a means by which the pipe threaded plug and a flange or other suitable means rigid with the liquid sensing means may be caused to rotate in unison, i. e., relative rotation therebetween prevented, while permitting limited relative axial movement therebetween with the limits of flexibility of the flexible metal member aforesaid. The provision of such an arrangement is a principal object of the present invention.

Figure 2:
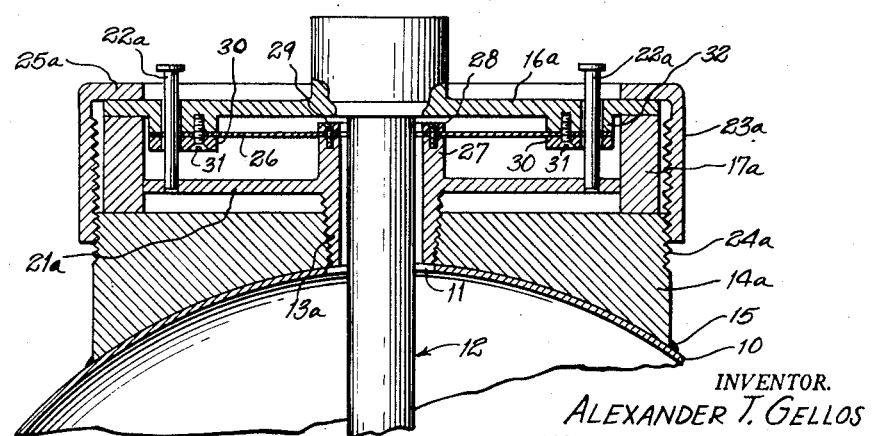

Other and more detailed objects of this invention will become apparent from the following description of certain preferred embodiments thereof, all when considered in connection with the accompanying drawings, in which:

Figure 1 is a view principally in central vertical section and with some parts broken away and omitted, illustrating the device of the present invention applied to a tank for containing liquid oxygen; and Fig. 2 is a view similar to Fig. 1 showing a modified form of the invention.

Turning now particularly to the accompanying drawings and considering first the form shown in Fig. 1, there is illustrated a tank or container 10 having an aperture 11 therein, through which it may be desired to introduce a probe or liquid sensing means generally indicated at 12. The liquid sensing means 12 is preferably an electrical capacitor, which is arranged to be immersed in the liquid in the tank or container 10 to an extent dependent upon the depth of this liquid. As such, the capacitance of this capacitor will be a joint function of the depth and of the dielectric constant of the liquid.

Such a capacitor may then be connected into an electric circuit such as is shown, for example, in the U. S. reissue patent to Edelman No. Re. 23,493, reissued May 20, 1952, or such as is disclosed in the copending U. S. application of Sontheimer et al., Ser. No. 177,574, filed August 4, 1950. In any event the particular type of electrical circuit with which the sensing device here shown is used forms per se no part of the present invention. It is noted, however, that in all these circuits and in others which will be familiar to those skilled in the art, the sensing device is particularly sensitive to the depth of the liquid and therefore must be placed at a particular point in a vertical direction, so as to give an indication which will be accurately indicative of this depth. Means must be provided, and are so provided in accordance with the present invention, for accurately positioning the liquid sensing device 12 with respect to the tank or container 10.

In the present instance, however, and due to the fact that the container 10 is one which is adapted to contain a liquified gas, such as oxygen under some very substantial superatmospheric pressure, it is desired that a pipe threaded plug here shown at 13 be provided which will threadedly engage the complementary threads formed on the inside of an aperture extending through a collar 14, which may be welded or otherwise suitably secured to the tank 10 as shown at 15 with the threaded aperture therein substantially coaxial with the aperture 11 through the tank wall. It is recognized that the pipe threaded plug 13 will not always seat at the same level in the pipe threads in the collar 14. In order therefore, to accommodate this seating of the plug 13 at different levels from time to time, while maintaining the liquid sensing means 12 always at the same level, the latter has secured thereto an outwardly extending flange portion 16, which is suitably secured, as by welding, to the upper end of the liquid sensing means 12 in a manner not particularly illustrated, but which will in all instances be gas-tight. As shown, the flange portion 16 may seat upon an upwardly extending portion of the collar 14; or alternately, a suitable annular spacer 17 may be disposed therebetween as shown. In other words, the collar 14 and the spacer 17 may, if desired, be made as one integral piece; or they may be two separate pieces, and secured together or not at the option of the maker or user. In any event, it will be seen that the collar 14 and spacer 17 serve to provide a suitable seat for supporting the flange portion 16 at a level which will be predetermined and definite, so as accurately to position the liquid sensing means 12 in a vertical direction.

There is disposed between the plug member 13 and the flange portion 16 a flexible metallic member here shown as an annularly corrugated, substantially cylindrical bellows 18 such as are now well known in the art, this flexible member or bellows being suitably secured in a gas-tight manner around one annular line or junction 19 to the plug member 13 and around another annular line or junction at 20 to the flange 16. As shown the liquid sensing member 12 extends freely through the bellows 18 and also through a central aperture in the plug member 13.

The construction described provides for the seating of the plug 13 at any point where it may happen to seat, while permitting the accurate positioning of the liquid sensing means 12 and with such relative vertical differences in position as may be accommodated by flexibility of the bellows 18. At the same time, while gaseous pressure from the inside of the tank or container 10 may pass freely through the aperture 11 and through the annular space between the liquid sensing means 12 and the plug 13 and also into the interior of the bellows 18, this gaseous pressure is positively prevented from leaking out due to the annular seals at 19 and 20 between the bellows 18 and the plug 13 on the one hand and the annular flange 16 on the other.

This construction would be reasonably complete, except that it is practically necessary to prevent relative rotation between the plug 13 and the flange member 16, so as to prevent damage to the bellows 18 and to its annular seals at 19 and 20. For this purpose the plug 13 may be provided with a flange or spider portion 21 in which two or more stud members 22 may be secured, these stud members being arranged outside the bellows 18 and passing freely through aligned apertures in the flange member 16 as shown. Inasmuch as the stud members 22 are disposed parallel to the vertical axis of the plug 13, the liquid sensing means 12 and other parts, it will be seen that relative vertical adjustive positioning is permitted between the plug 13 and the flange 16, while relative rotation between these two parts about their common axis is prevented.

Means are also provided for holding the flange member 16 accurately in position on top of the spacer 17 as shown. For this purpose there is provided a nut member 23 threaded onto external threads 24 on the collar member 14 and having an inwardly directed flange 25 for engaging the flange portion 16.

Turning now to the form of the invention shown in Fig. 2, the purpose of which is primarily to illustrate a different form of flexible member, there is shown an apparatus similar in its purpose and general functioning to that of Fig. 1 and wherein the same or similar reference characters (in some instances with the letter *a* added) are used for corresponding parts in this form of the invention.

In Fig. 2 is shown a portion of a tank or container 10 having an aperture 11 into which there may be inserted a liquid sensing device 12, all of which may be the same as previously described. Surrounding the aperture 11 and on the outside of the container 10, is a collar member 14a which may be suitably, rigidly secured to the tank or container 10 as by welding as shown at 15. The collar member 14a is provided with an opening in alignment with the opening 11 and having pipe or tapered threads therein, into which is adapted to be threaded a pipe threaded plug 13a having an aperture therethrough coaxial with the aperture 11 and with the liquid sensing device 12 (presently to be described for this form of the invention) so as freely to receive this device.

The liquid sensing means 12 in the form of Fig. 2 may be the same as in the Fig. 1 form and similarly has secured thereto at its upper end a flange portion 16a, which is arranged to seat at its outer periphery on the upper surface of an annular spacer 17a as shown. Here, as in the previous form of the invention, it will be understood that the spacer 17a could be formed as an integral part of the collar member 14a or be formed separate therefrom and secured thereto or not as desired.

In this form of the invention, the flexible member corresponding in purpose and function to the bellows 18 is in the form of a substantially planiform annular flexible diaphragm 26. This diaphragm has its inner peripheral portion secured to an upstanding annular portion 27 of the plug 13a, for example by providing an annular ring 28 which is arranged to confine this inner peripheral portion of the diaphragm 26 and may be secured to the annular portion 27 by a plurality of screws 29. In a similar manner, the outer peripheral portion of the diaphragm 26 may be secured by an annular ring 30 and a plurality of screws 31 to a downwardly extending annular portion 32 of the flange portion 16a.

It will be seen from the foregoing description and from the showing of Fig. 2 of the drawings that the flexible diaphragm 26 will have the same function as the flexible bellows 18. It will be further understood that if desired this diaphragm could be concentrically annularly corrugated to provide additional flexibility and to permit a larger measure of relative axial positioning of the plug 13a with respect to the flange portion 16a. In any event it will be seen that the flexible diaphragm 26 serves to effect a gas-tight seal between the plug 13a and the flange portion 16a, so as positively to prevent the loss of pressure from the inside of the container or tank 10 once the parts are in their normal operative position as shown in the drawings.

It will be noted that the plug 13a is similarly provided with a flange or spider portion 21a in which is secured two or more studs 22a which extend freely through suitable apertures in the flange portion 16a and through such other parts as are necessary as shown in the drawing.

Also as in the form of the invention of Fig. 1, there is provided an annular nut 23a, which is threaded onto the collar member 14a and has an inwardly extending flange portion 25a for engaging the upper portion of the outer periphery of the flange member 16a and for holding this flange onto the spacer 17a.

While there is herein shown and described but two different forms of the invention and certain minor variants have been suggested as the description has proceeded, further variants or equivalents will suggest themselves to those skilled in the art from the foregoing description and the accompanying drawings. I do not wish to be limited, therefore, except by the scope of the appended claims, which are to be construed validly as broadly as the state of the prior art permits.

What is claimed is:

1. Liquid gauging means for liquid oxygen containers and the like, comprising the combination with a metallic container having means providing an opening for receiving a liquid sensing means and having pipe-threads about said opening, of a complementarily pipe-threaded annular plug adapted to be screwed into said opening to effect a pressure-tight seal, an annular support predetermined in position with respect to said container and surrounding said opening, a supporting flange rigidly secured in a gas-tight manner to said liquid sensing means and adapted to be received on and accurately positioned by said annular support, so as accurately to position said liquid sensing means in said container, flexible means interconnecting said annular plug and said supporting flange in a gas-tight manner, and means for preventing relative rotation between said plug and said supporting flange while permitting relative adjustive positioning therebetween in a direction substantially axial of said liquid sensing means and to an extent limited by the flexibility of said flexible means.

2. Liquid gauging means according to claim 1, comprising in addition, an annular nut threaded onto a part of said annular support for holding said supporting flange firmly and accurately on said annular support.

3. Liquid gauging means according to claim 1, in which said liquid sensing means comprises an electric capacitor which is constructed and arranged to extend into the liquid to be measured to an extent dependent upon the depth of the liquid, so that the capacitance of said capacitor will be a joint function of the depth and of the dielectric constant of said liquid.

4. Liquid gauging means according to claim 1, in which said flexible means comprises a substantially tubular metallic bellows, one end of which is sealed in a gas-tight manner to said annular plug and the other end of which is sealed in a gas-tight manner to said supporting flange; said plug member, said metallic bellows and said flange all being arranged substantially coaxially.

5. Liquid gauging means according to claim 1, in which said flexible means comprises an annular substantially planiform, metallic diaphragm having an inner peripheral portion which is sealed in a gas-tight manner to said annular plug and an outer peripheral portion which is sealed in a gas-tight manner to a portion of said supporting flange.

References Cited in the file of this patent

UNITED STATES PATENTS

| | | |
|---|---|---|
| 1,725,027 | Tampier | Aug. 20, 1929 |
| 2,098,085 | D'Arcey | Nov. 2, 1937 |
| 2,509,770 | Kresta | May 30, 1950 |